Patented Mar. 3, 1953

2,630,443

UNITED STATES PATENT OFFICE 2,630,443

PROCESS FOR THE PREPARATION OF THE MIXED ANHYDRIDES OF ORGANIC CARBOXYLIC ACIDS AND ORTHO TITANIC ACID

Thomas Boyd, Springfield, Mass., assignor to Monsanto Chemical Company, St. Louis, Mo., a corporation of Delaware No Drawing. Application October 21, 1949, Serial No. 122,842

8 Claims. (Cl. 260—429)

This invention relates to mixed anhydrides of organic carboxylic acids and ortho titanic acid. More particularly, this invention relates to a new process for the preparation of the mixed anhydrides of organic carboxylic acids and ortho titanic acid.

One object of this invention is to provide a process for the preparation of the mixed anhydrides of organic carboxylic acids and ortho titanic acid.

This and other objects are attained by reacting titanium disulfide with an organic carboxylic acid under substantially anhydrous conditions.

The following examples are given in illustration and are not intended as limitations upon the scope of this invention. Where parts are mentioned, they are parts by weight.

Example I

Six mols of acetic anhydride were added slowly to one mol of titanium disulfide at such a rate that the temperature of the mixture did not rise above 80° C. The reaction mixture was then heated at 70–90° C. for about 2 hours, filtered while still hot and then distilled under vacuum (5–15 mm. mercury absolute pressure) until the temperature rose to 40° C. The residue was again filtered and finally purified by solvent extraction with chloroform. A solid mixed anhydride of acetic acid and ortho titanic acid was obtained.

Example II

To a solution of one mol of titanium disulfide in benzene, six molecular equivalents of phthalic anhydride were added at such a rate that the temperature of the solution did not rise above 60° C. The resultant mixture was heated under reflux for about one hour at 70–80° C., filtered hot and then distilled under vacuum (5–15 mm. mercury) until the distillation temperature rose to about 50° C. The residue was then refined by solvent extraction with chloroform. A colorless crystalline solid was obtained which was identified as titanium tetraphthalate, a mixed anhydride of phthalic acid and ortho titanic acid.

Example III

Titanium tetralactate was prepared in a manner similar to the preparation of titanium tetraphthalate. Six mols of lactic acid were added slowly to one mol of titanium disulfide while keeping the temperature of the solution below 40° C. After heating the solution at about 70° C. for about one hour, followed by hot filtration, it was vacuum distilled at a pressure of 5–15 mm. mercury absolute, until the temperature rose to 40° C. After solvent extraction with chloroform, a solid mixed anhydride of ortho titanic acid and lactic acid was obtained.

Other acids, acid anhydrides and mixtures thereof may be used in the process of this invention. The acids may be mono- or polycarboxylic acids and they may be saturated or unsaturated. Furthermore, they may be substituted in the side chain by various substituents such as halogen, including chlorine, bromine, fluorine, and iodine, or hydroxyl, amino, nitro, etc. groups. The acids may be straight chain or branched chain and they may be cyclic or heterocyclic. Among the acids which may be used are acetic, propionic, butyric, isobutyric, pentanoic, lauric, stearic, phthalic, tricarballylic, malonic, glutaric, mellitic, suberic, succinic, acrylic, methacrylic, crotonic, atropic, maleic, fumaric, citraconic, aconitic, tiglic, oleic, elaidic, behenic, propiolic, chloracetic, trichloracetic, lactic, salicylic, aminobutyric, nitrobutyric, benzoic, naphthoic, toluic, campholic, camphoric, pyromucic, thiophene carboxylic, picolinic, quinolinic, etc. acids.

The reaction should be carried out under substantially anhydrous conditions to prevent hydrolysis of the reaction products. As shown in the examples, it is preferable to use an excess of the acid or anhydride to act as a solvent during the reaction and to insure that the reaction will go to completion. However, when the acids are solids, the reaction can be more advantageously carried out in an inert anhydrous solvent such as benzene, naphthalene, aliphatic hydrocarbons, etc. At least 4 molecular equivalents of acid or acid anhydride should be used per mol of titanium disulfide. The temperature of the reaction may be varied to suit the particular acid being used with due respect to volatility and stability of the acid and the volatility and boiling point of the solvent.

Purification of the reaction product is advantageously carried out by filtration, vacuum distillation and/or solvent extraction. However, the distillation need not be under vacuum.

The process of this invention provides a simple and easy process for the preparation of the mixed anhydrides of ortho titanic acid and organic carboxylic acids. No catalysts or other reaction aids are necessary and the products are easily recovered in a pure form from the reaction medium.

The mixed anhydrides are particularly useful as tanning agents, mordants and water-repellents in textile and paper manufacture and as modifiers for thermoplastic and thermosetting coating compositions.

It is obvious that variations may be made in the process of this invention without departing from the spirit and scope thereof as defined in the appended claims.

What is claimed is:

1. A process which comprises reacting one mol of titanium disulfide with at least four molecular equivalents of an organic carboxylic acid, said process being carried out under substantially anhydrous conditions.

2. A process which comprises reacting one mol of titanium disulfide with at least four molecular equivalents of an organic monocarboxylic acid, said process being carried out under substantially anhydrous conditions.

3. A process as in claim 2 wherein the acid is saturated.

4. A process as in claim 2 wherein the acid is unsaturated.

5. A process as in claim 1 wherein the acid is a polycarboxylic acid.

6. A process as in claim 5 wherein the acid is phthalic acid.

7. A process as in claim 1 wherein the acid is a substituted acid.

8. A process as in claim 7 wherein the acid is lactic acid.

THOMAS BOYD.

REFERENCES CITED

The following references are of record in the file of this patent:

UNITED STATES PATENTS

| Number | Name | Date |
| --- | --- | --- |
| 1,059,740 | Liebknecht et al. | Apr. 22, 1913 |
| 2,233,358 | Nutting | Feb. 25, 1941 |
| 2,453,520 | Langkammerer | Nov. 9, 1948 |